United States Patent
Li et al.

(10) Patent No.: US 12,272,002 B2
(45) Date of Patent: Apr. 8, 2025

(54) METHOD AND APPARATUS FOR GENERATING VIRTUAL CHARACTER, ELECTRONIC DEVICE AND READABLE STORAGE MEDIUM

(71) Applicant: Beijing Baidu Netcom Science Technology Co., Ltd., Beijing (CN)

(72) Inventors: Jie Li, Beijing (CN); Haojie Liu, Beijing (CN); Yan Zhang, Beijing (CN); Xuecen Shen, Beijing (CN); Ruizhi Chen, Beijing (CN); Chen Zhao, Beijing (CN); Yuqiao Teng, Beijing (CN); Errui Ding, Beijing (CN); Tian Wu, Beijing (CN); Haifeng Wang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 194 days.

(21) Appl. No.: 18/082,997

(22) Filed: Dec. 16, 2022

(65) Prior Publication Data

US 2023/0120253 A1    Apr. 20, 2023

(30) Foreign Application Priority Data

Jun. 24, 2022  (CN) .......................... 202210721026.X

(51) Int. Cl.
*G06T 17/20*   (2006.01)
*G06T 13/40*   (2011.01)
*G06T 15/04*   (2011.01)

(52) U.S. Cl.
CPC ............ *G06T 17/205* (2013.01); *G06T 13/40* (2013.01); *G06T 15/04* (2013.01)

(58) Field of Classification Search
None
See application file for complete search history.

(56) References Cited

U.S. PATENT DOCUMENTS 9,317,967 B1 *  4/2016  Honsel ................... G06T 13/20
2018/0197341 A1  7/2018  Loberg
(Continued)

FOREIGN PATENT DOCUMENTS

| CN | 111105491 A | 5/2020 |
| CN | 113906473 A | 1/2022 |

(Continued)

OTHER PUBLICATIONS

Ni Dong; "Global Illumination Combination Algorithm for Virtual Reality and Mixed Reality"; Digital Printing, vol. 201, No. 3, pp. 157-164, 172; 2019; English-language abstract; DOI: 10.19370/j.cnki.cn10-1304/ts.2019.03.028 (9 pages).

(Continued)

*Primary Examiner* — Ryan M Gray
(74) *Attorney, Agent, or Firm* — ICE MILLER LLP; Justin D. Swindells

(57) ABSTRACT

A method and apparatus for generating a virtual character, an electronic device and a computer readable storage medium are provided. The method includes: performing mesh simplification on an initial model of a virtual character to obtain a mesh-simplified model; obtaining a first target model by performing white model mapping rendering on an area of each material type on the mesh-simplified model, and obtaining a second target model by performing hyper-realistic rendering on the area of each material type on the mesh-simplified model; and establishing a bidirectional mapping between the first target model and the second target model, and obtaining a target virtual character through iterative updating of the bidirectional mapping.

17 Claims, 4 Drawing Sheets

(56) References Cited

U.S. PATENT DOCUMENTS

| | | | |
|---|---|---|---|
| 2020/0184721 A1* | 6/2020 | Ge | G06N 3/045 |
| 2020/0273231 A1 | 8/2020 | Schied et al. | |
| 2020/0320777 A1 | 10/2020 | Meshry | |
| 2021/0005013 A1 | 1/2021 | Mitchell | |
| 2021/0074059 A1 | 3/2021 | Ando | |
| 2021/0174568 A1 | 6/2021 | Chen et al. | |
| 2022/0108422 A1* | 4/2022 | Choi | G06T 17/20 |
| 2022/0165040 A1* | 5/2022 | Munkberg | G06T 19/20 |
| 2022/0176245 A1* | 6/2022 | Lewin | A63F 13/52 |

FOREIGN PATENT DOCUMENTS

| | | |
|---|---|---|
| CN | 114022616 A | 2/2022 |
| CN | 114549710 A | 5/2022 |
| JP | 2002-197016 A | 7/2002 |
| JP | 2021-082928 A | 5/2021 |
| JP | 2021-527861 A | 10/2021 |
| JP | 2022-520919 A | 4/2022 |
| WO | 2019/225734 A1 | 11/2019 |
| WO | 2021/092454 A1 | 5/2021 |

OTHER PUBLICATIONS

3DMAX Tutorial: Rendering white must look at the five-step rule of Vray rendering in super realistic style; with English machine translation; undated (39 pages).

Xu Lei et al.; "Modern Distance Education Lifting Machinery Application of V-Ray Renderer in Virtual Environment"; Science and Technology and Education, Issue 2, 2018. Total Issue 267, pp. 41-43; 2018, with English translation (6 pages).

* cited by examiner

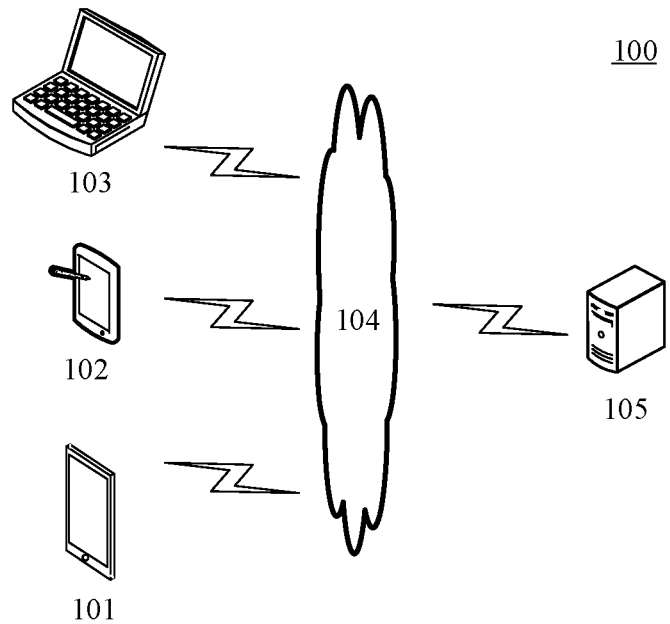

Fig. 1

Performing mesh simplification on an initial model of the virtual character to obtain a mesh-simplified model — 201

Obtaining a first target model by performing white model mapping rendering on an area of each material type on the mesh-simplified model, and obtaining a second target model by performing hyper-realistic rendering on the area of each material type on the mesh-simplified model — 202

Establishing a bidirectional mapping between the first target model and the second target model, and obtaining a target virtual character through iterative updating of the bidirectional mapping — 203

Fig. 2

METHOD AND APPARATUS FOR GENERATING VIRTUAL CHARACTER, ELECTRONIC DEVICE AND READABLE STORAGE MEDIUM

CROSS-REFERENCE TO RELATED APPLICATIONS

The present application claims the priority of Chinese Patent Application No. 202210721026.X, titled "METHOD AND APPARATUS FOR GENERATING VIRTUAL CHARACTER, ELECTRONIC DEVICE AND READABLE STORAGE MEDIUM", filed on Jun. 24, 2022, the content of which is incorporated herein by reference in its entirety.

TECHNICAL FIELD

The present disclosure relates to the field of artificial intelligence technology, in particular to the technical fields of deep learning, computer vision, augmented reality (AR), and virtual reality, may be applied to scenarios such as virtual character generation, and more particularly, to a method and apparatus for generating a virtual character, an electronic device and a computer readable storage medium.

BACKGROUND

Virtual characters are a key component in creating a virtual world of metaverse. The construction of the virtual world of metaverse is based on subjective and objective requirements such as high detail, high immersion, and low latency.

According to different needs of different application scenarios, virtual characters such as virtual digital people may be divided into 2D, 3D, cartoon, realistic, hyper-realistic and other categories.

SUMMARY

Embodiments of the present disclosure provide a method and apparatus for generating a virtual character, an electronic device, a computer readable storage medium and a computer program product.

In a first aspect, an embodiment of the present disclosure provides a method for generating a virtual character, including: performing mesh simplification on an initial model of the virtual character to obtain a mesh-simplified model; obtaining a first target model by performing white model mapping rendering on an area of each material type on the mesh-simplified model, and obtaining a second target model by performing hyper-realistic rendering on the area of each material type on the mesh-simplified model.

In a second aspect, an embodiment of the present disclosure provides an apparatus for generating a virtual character, including: a mesh simplification unit, configured to perform mesh simplification on an initial model of the virtual character to obtain a mesh-simplified model; a partition-rendering unit, configured to obtain a first target model by performing white model mapping rendering on an area of each material type on the mesh-simplified model, and obtain a second target model by performing hyper-realistic rendering on the area of each material type on the mesh-simplified model; and a target virtual character generating unit, configured to establish a bidirectional mapping between the first target model and the second target model, and obtain a target virtual character through iterative updating of the bidirectional mapping.

In a third aspect, an embodiment of the present disclosure provides an electronic device, including: at least one processor; and a memory communicatively connected to the at least one processor; where, the memory stores instructions executable by the at least one processor, and the instructions, when executed by the at least one processor, cause the at least one processor to perform the method for generating a virtual character described in any of implementations of the second aspect.

In a fourth aspect, an embodiment of the present disclosure provides a non-transitory computer readable storage medium storing computer instructions, where, the computer instructions are used to cause the computer to perform the method for generating a virtual character described in any of implementations of the second aspect.

In a fifth aspect, an embodiment of the present disclosure provides a computer program product including a computer program is provided, where the computer program, when executed by a processor, causes the processor to perform the method for generating a virtual character described in any of implementations of the first aspect.

It should be understood that the content described in this section is not intended to identify key or important features of the embodiments of the present disclosure, nor is it intended to limit the scope of the present disclosure. Other features of the present disclosure will become readily understood from the following specification.

BRIEF DESCRIPTION OF THE DRAWINGS

Other features, objectives and advantages of the present disclosure will become more apparent upon reading the detailed description of non-limiting embodiment with reference to the following accompanying drawings.

FIG. 1 is an example system architecture to which the present disclosure may be applied;

FIG. 2 is a flowchart of a method for generating a virtual character provided by an embodiment of the present disclosure;

DETAILED DESCRIPTION OF EMBODIMENTS

Figure 3:
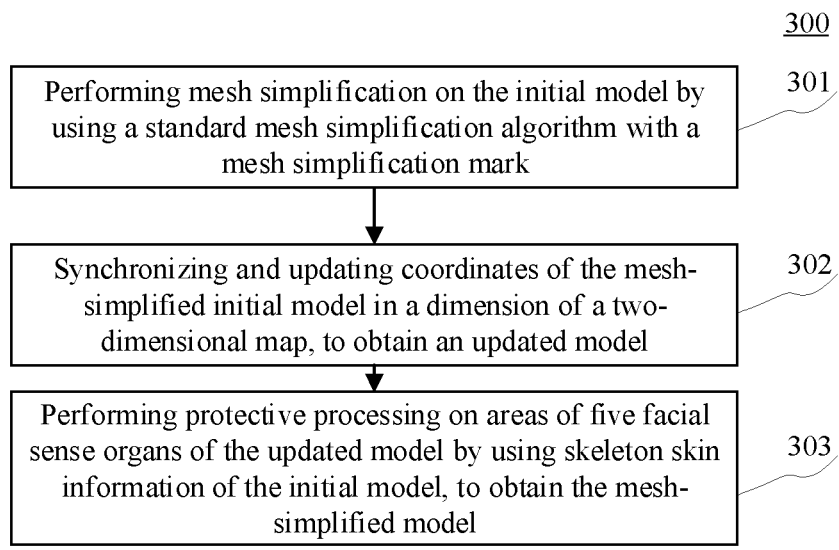
FIG. 3 is a flowchart of a method for performing mesh simplification on an initial model in the method for generating a virtual character provided by an embodiment of the present disclosure.

Example embodiments of the present disclosure are described below with reference to the accompanying drawings, where various details of the embodiments of the present disclosure are included to facilitate understanding, and should be considered merely as examples. Therefore, those of ordinary skills in the art should realize that various changes and modifications can be made to the embodiments described herein without departing from the scope and spirit of the present disclosure. Similarly, for clearness and conciseness, descriptions of well-known functions and structures are omitted in the following description. It should be noted that the embodiments of the present disclosure and features in the embodiments may be combined with each other on a non-conflict basis.

In the technical solution of the present disclosure, the collection, storage, use, processing, transmission, provision and disclosure of the user personal information involved are all in compliance with the relevant laws and regulations, and do not violate public order and good customs.

FIG. 1 shows an example system architecture 100 to which embodiments of a method and apparatus for generating a virtual character, an electronic device and a computer readable storage medium of the present disclosure may be applied.

As shown in FIG. 1, the system architecture 100 may include terminal devices 101, 102, and 103, a network 104, and a server 105. The network 104 serves as a medium providing a communication link between the terminal devices 101, 102, 103, and the server 105. The network 104 may include various types of connections, such as wired or wireless communication links, or optical cables.

Users may use the terminal devices 101, 102, 103 to interact with the server 105 through the network 104 to receive or send messages. Various applications for information and communication between the terminal devices and the server may be installed on the terminal devices 101, 102, 103 and the server 105, such as virtual reality applications, virtual character creation applications, or model rendering applications.

The terminal devices 101, 102, 103 may be hardware or software. When the terminal devices 101, 102 and 103 are hardware, they may be various electronic devices having display screens, including but not limited to smartphones, tablet computers, laptops computers, desktop computers, or the like; when the terminal devices 101, 102, and 103 are software, they may be installed in the above listed electronic devices, which may be implemented as multiple software pieces or software modules, or as a single software piece or software module, which is not specifically limited herein. When the server 105 is hardware, it may be implemented as a distributed server cluster composed of multiple servers, or it may be implemented as a single server; when the server is software, it may be implemented as multiple software pieces or software modules, or it may be implemented as a single software piece or software module, which is not specifically limited herein.

The server 105 may provide various services through various built-in applications. Using a model rendering application that may provide a virtual character generation service as an example, the server 105 may achieve the following effects when running the model rendering application: first, through the network 104, virtual character parameters input by a user through the terminal devices 101, 102, 103 are received; then, an initial model of a corresponding virtual character is determined based on the virtual character parameters; next, mesh simplification is performed on the initial model to obtain a mesh-simplified model; in the next step, a first target model is obtained by performing white model mapping rendering on an area of each material type on the mesh-simplified model, and a second target model is obtained by performing hyper-realistic rendering on the area of each material type on the mesh-simplified model; then, a bidirectional mapping is established between the first target model and the second target model, and a target virtual character is obtained through iterative updating of the bidirectional mapping.

Further, the server 105 may also return a screen image of the target virtual character to the terminal devices 101, 102, and 103 through the network 104, so that the user may see the corresponding virtual character and then determine whether the virtual character may be used in a virtual data space.

It should be noted that, in addition to being temporarily acquired from the terminal devices 101, 102 and 103 through the network 104, the virtual character parameters may alternatively be pre-stored locally in the server 105 in various methods. Therefore, when the server 105 detects that the data has been stored locally (e.g., when it starts processing a to-be-processed task that was left before), the server 105 may choose to acquire the data directly from the local. In this case, the example system architecture 100 may not include the terminal devices 101, 102, 103 and the network 104.

The method for generating a virtual character provided by subsequent embodiments of the present disclosure may be performed by the server 105 with strong computing power, or all or part of steps provided by the embodiments of the present disclosure may be performed by the terminal devices 101, 102, 103 with relatively weak computing power when mesh simplification operation has already been performed, and it only needs to determine that the computing power for generating the virtual character of the present disclosure may be provided by the terminal devices.

It should be understood that the numbers of terminal devices, networks, and servers in FIG. 1 are merely illustrative. Any number of terminal devices, networks, and servers may be provided according to implementation needs.

With reference to FIG. 2, FIG. 2 is a flowchart of a method for generating a virtual character provided by an embodiment of the present disclosure, where a flow 200 includes the following steps.

Step 201: performing mesh simplification on an initial model of the virtual character to obtain a mesh-simplified model.

A purpose of this step is to perform mesh simplification on the initial model of the virtual character using a mesh simplification algorithm by an executing body (e.g., the server 105 or the terminal devices 101, 102, 103 shown in FIG. 1) of the method for generating a virtual character, so as to reduce a number of triangular patches constituting the initial model, thereby reducing complexity of the model to obtain the mesh-simplified model.

Because browsing and interactive operations in the three-dimensional scenario are closer to human perception ways and feelings in a real environment, and virtual simulation technology, graphics technology, network technology and digital city technology develop rapidly, there is a growing demand for three-dimensional simulation applications. However, as components of simulation scenarios, three-dimensional models generated by using modeling tools or scanners tend to have large data size, and if the three-dimensional models are directly processed through a graphics pipeline, it is often beyond a capacity of the hardware and cannot meet the requirements of real-time display.

Automatic simplification technology provides a solution for dealing with complex models with large data size. While keeping a scenario as realistic as possible, details of the model are gradually simplified based on the importance degrees of surfaces, thereby reducing a hardware burden. A purpose of the automatic simplification technology is that it can generate a detailed model of an object in the scenario to improve a rendering speed of the entire scenario. A size of a model file is reduced, and it is suitable for publishing and downloading on the internet. The automatic processing technology may also reduce work intensity of manually editing three-dimensional scenarios having large data size.

At the present stage, quite a few computer graphics applications require the use of complex, high-detail models to give people a more realistic visual experience. In this case, when making a model, it is required to achieve a very high resolution to meet the needs for detail. However, when the model is used, the model is not required to be presented in full details each time. The more complex the model is, the higher the computational cost is. Sometimes a simplified version of a complex model is sufficient. Therefore, it is important to automatically generate simplified versions of these models.

A commonly used simplification method is based on a simplification algorithm, such as iterative shrinkage and quadratic error metric, which may quickly generate a high-quality approximate model of a polygonal model, and ensure efficiency and quality of the simplification method. Also, the polygonal models may not only include complex geometric elements, but also may include different surface properties such as color, texture, and face normal vectors. While simplifying the geometric elements, a general form of the simplification method also involves processing the color and texture of vertices.

That is, the mesh simplification method performed in the step may directly use the existing simplification algorithm, or may use an optimized simplification algorithm obtained by considering model properties and demand properties for constructing a virtual character.

Step 202: obtaining a first target model by performing white model mapping rendering on an area of each material type on the mesh-simplified model, and obtaining a second target model by performing hyper-realistic rendering on the area of each material type on the mesh-simplified model.

On the basis of step 201, a purpose of this step is to perform partition rendering on the mesh-simplified model by the executing body. A partitioning method is to partition the mesh-simplified model into areas each having a same material type, that is, during serial rendering, only an area of one given material type is rendered. Areas of other material types may be rendered until the area of the given material type is rendered. If parallel rendering is available, each rendering thread is only responsible for rendering the area of one material type. In addition, combining with rendering purpose and usage scenario of the virtual character required by the present disclosure, rendering is also subdivided into white model mapping rendering and hyper-realistic rendering.

When rendering a model, depending on properties of different parts of the model, such as different reflection properties of light, the model may be divided into different materials, including: diffuse material, glossy material, specular material, mixed material, etc. In addition, different material types may alternatively be determined according to other properties, for example, gloss properties and elastic properties of different metals, etc.

Compared with rendering results of white model mapping rendering, hyper-realistic rendering has higher realism, fineness and fidelity, which is more in line with a virtual character of the user in a virtual data space.

Step 203: establishing a bidirectional mapping between the first target model and the second target model, and obtaining a target virtual character through iterative updating of the bidirectional mapping.

On the basis of step 202, a purpose of this step is to establish the bidirectional mapping between the first target model and the second target model by the executing body, and obtain a final model that can serve as the target virtual character through iterative updating of the bidirectional mapping. Here, the final model corresponding to the target virtual character is obtained on a basis of the second target model, and is a new model with model details that are not available on the second target model and learned from the first target model.

In brief, the final model corresponding to the target virtual character is an optimized version of the second target model, and an optimization direction is to add the model details recorded only in the first target model, which is also the purpose of establishing the bidirectional mapping between the first target model and the second target model in this step.

A purpose of the iterative updating is to optimize the initial bidirectional mapping relationship, so that the optimized mapping relationship is more accurate, thereby providing a more accurate optimization direction for the second target model.

By performing mesh simplification on an initial model of a virtual character to reduce the number of meshes of the model, the method for generating the virtual character provided in the present disclosure reduces complexity of the model. At the same time, combined with partition rendering according to material type, a rendering efficiency is improved. In order to avoid losses of realism and fidelity of the virtual character due to mesh simplification, a bidirectional mapping between white model mapping rendering and hyper-realistic rendering is also established so that hyper-realistic rendering may further learn missing model details recorded in white model mapping rendering from the mapping relationship, thereby improving the realism and fidelity of a target virtual character is improved. While performing mesh simplification, a visual effect of the virtual character is also improved.

Further, in addition to performing partition rendering according to material type in step 202, partitioning may also be performed in other methods that have a similar effect, to improve the rendering efficiency by also using the idea of partitioning. For example, performing partitioning based on areas with connectivity, performing partitioning based on different parts of the virtual character, performing partitioning based on complexity degrees, and so on.

With reference to FIG. 3, FIG. 3 is a flowchart of a method for performing mesh simplification on an initial model provided by an embodiment of the present disclosure, that is, a specific implementation is provided for step 201 in the flow 200 shown in FIG. 2, and other steps in the flow 200 are not adjusted, that is, step 201 may be replaced by the specific implementation provided in the present embodiment to obtain a new complete embodiment. A flow 300 includes the following steps.

Step 301: performing mesh simplification on the initial model by using a standard mesh simplification algorithm with a mesh simplification mark.

Since an object to be mesh-simplified in the present disclosure is the initial model corresponding to the virtual character, information of the facial area receives most attention, compared with information of the other areas constituting the virtual character. Therefore, in order to avoid losing too many details of the facial area due to an unified mesh simplification operation, this step adds a mesh simplification label to the standard mesh simplification algorithm in advance, and uses the mesh simplification label to indicate that a degree of mesh simplification on the facial area of the initial model is less than a degree of mesh simplification on other areas (such as torso, limbs), so that by reducing the degree of mesh simplification on the facial area, facial details of the initial model may be preserved as much as possible. In contrast, for other areas with less attention and less details (such as torso, limbs), a high degree of mesh simplification may be used, so that an overall degree of mesh simplification on the initial model is still considerable.

In addition, if the initial model in other scenarios also needs to be mesh-simplified, it is also possible to adaptively set the degree of mesh simplification for different parts based on the different attention of each part of the model, so that parts with high attentions may not lose too many details due to a high degree of mesh simplification.

The standard mesh simplification algorithm may be a standard quadratic error metric simplification algorithm, or may be other simplification algorithms that may achieve the same or similar simplification effect.

Step 302: synchronizing and updating coordinates of the mesh-simplified initial model in a dimension of a two-dimensional map, to obtain an updated model.

A purpose of this step is that, in the process of performing mesh simplification by the executing body, on the basis of only conventionally updating three-dimensional coordinates of key points of each triangular patch of the initial model, the coordinates of the mesh-simplified initial model in a dimension (UV dimension) of the two-dimensional map are also synchronized and updated to obtain the updated model.

That is, by adding an updating dimension, a dislocation problem of key point reduction caused by the mesh simplification algorithm may be avoided, so that in the case of key point reduction, coordinates of the remaining few key points are more appropriate, rather than remaining in their original positions.

Further, in addition to adding the dimension of the two-dimensional mapping, an RGB (Red Green Blue) dimension, a dimension of a normal of each patch, etc., may also be added, that is, other dimensions that may optimize proximity degree between the mesh-simplified model and the initial model may be spontaneously added to make up for the loss of model details due to mesh simplification.

Step 303: performing protective processing on areas of five facial sense organs of the updated model by using skeleton skin information of the initial model, to obtain the mesh-simplified model.

A purpose of this step is to use the skeleton skin information of the initial model to perform protective processing on the areas of five facial sense organs of the updated model by the executing body, so as to obtain an accurate skeleton skin weight by using the skeleton skin information of the initial model. Then, a displacement of key points in the areas of five facial sense organs of the updated model may be corrected by using the skeleton skin weight, so that the obtained mesh-simplified model is closer to the initial model.

The present embodiment provides a mesh simplification solution for the initial model corresponding to the virtual character through step 301 to step 303. In step 301, by adding a facial boundary protection mark to the facial area, when performing mesh simplification operation on the initial model, mesh simplification is performed at a lower degree on the facial area that receives the most attention, so that the model details in the facial area are preserved as many as possible. In step 302, in addition to only conventionally updating three-dimensional coordinates of key points of each triangular patch of the initial model, an update step for the coordinates in the dimension of the two-dimensional mapping is added, so that the virtual character is more suitable for final display and use in a UV space. In step 303, by using the skeleton skin information of the initial model to perform protective processing on the areas of five facial sense organs of the updated model, the processed facial key points of the updated model have a more accurate skeleton skin weight, which can achieve more accurate facial expressions, and improve the realism and fidelity of expressions in the mesh-simplified model.

It should be noted that step 301 may also be used alone as a complete inferior implementation scheme for performing mesh simplification on the initial model, or it may be combined with step 302 to step 303 as shown in the flow 300 to obtain another more comprehensive, complete inferior implementation scheme that can improve the realism and fidelity of the model as much as possible while maintaining the degree of mesh simplification. The specific implementation scheme may be chosen flexibly according to the actual situation. The present embodiment only serves as a preferred embodiment containing step 301 and step 302 to step 303 at the same time.

On the basis of the embodiment shown in FIG. 3, before performing mesh simplification on the initial model by using the standard mesh simplification algorithm with a facial boundary protection mark, a parameter of a mesh simplification degree specifically used by the standard mesh simplification algorithm may also be determined in combination with a computing performance of the executing body.

An implementation includes but is not limited to: determining a device type of a current device; and determining, in response to the device type being a mobile terminal, a parameter of a target mesh simplification degree matching a computing performance of the current mobile terminal. The stronger the computing performance, the higher the degree of mesh simplification indicated by the parameter of the target mesh simplification degree.

Correspondingly, the parameter of the degree of mesh simplification of the standard mesh simplification algorithm in "performing mesh simplification on original virtual digital people by using the standard mesh simplification algorithm with a facial boundary protection mark" in the above embodiment may be the parameter of the target mesh simplification degree.

That is, the device type is first determined, and then by determining the computing performance of the device type, the parameter of the mesh simplification degree adapted to the computing performance is finally determined as the parameter of mesh simplification degree of the standard mesh simplification algorithm. In addition, even if all device types are mobile terminals, mobile terminals with different operating systems or different models have different computing performances. The above influencing factors also need to be fully considered when determining the computing performance of the mobile terminal.

On the basis of any of the above embodiments, in order to improve the proximity degree between the mesh-simplified model and the initial model as much as possible, a model alignment may be performed on the mesh-simplified model and the initial model and coordinates of two-dimensional maps of the mesh-simplified model and the initial model may also be updated, so as to avoid an obvious difference between the mesh-simplified model and the initial model after only performing mesh simplification.

Figure 4:
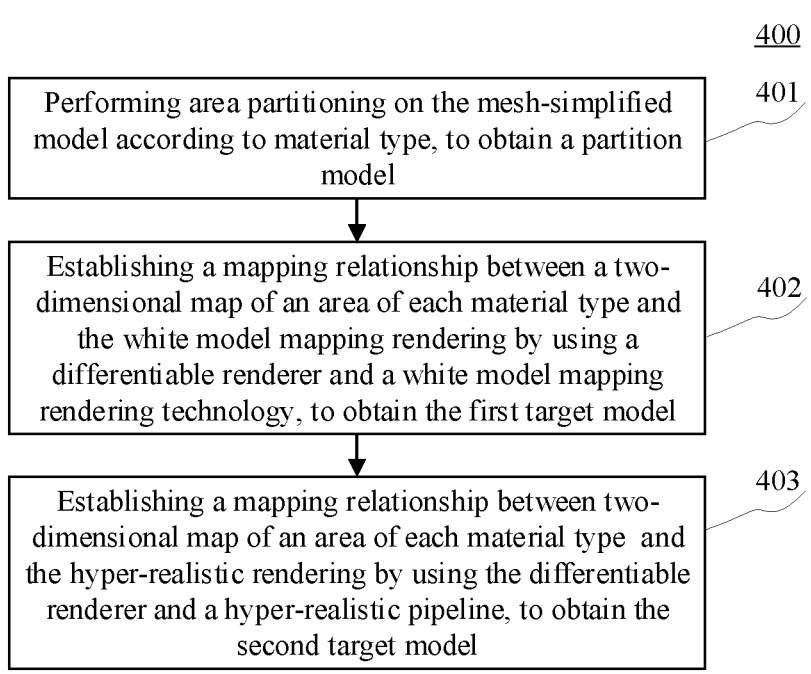
FIG. 4 is a flowchart of a method for performing partition rendering on a mesh-simplified model in the method for generating a virtual character provided by an embodiment of the present disclosure.

With reference to FIG. 4, FIG. 4 is a flowchart of a method for performing partition rendering on a mesh-simplified model provided by an embodiment of the present disclosure, that is, a specific implementation is provided for step 202 in the flow 200 shown in FIG. 2, and other steps in the flow 200 are not adjusted, that is, step 202 may be replaced by the specific implementation provided in the present embodiment to obtain a new complete embodiment. A flow 400 includes the following steps:

Step 401: performing area partitioning on the mesh-simplified model according to material type, to obtain a partition model.

A purpose of this step is to perform area partitioning on the mesh-simplified model according to material type by the executing body, i.e., to partition the mesh-simplified model into areas each having a same material type, to obtain the partition model.

Step 402: establishing a mapping relationship between a two-dimensional map of an area of each material type and the white model mapping rendering by using a differentiable renderer and a white model mapping rendering technology, to obtain the first target model.

A purpose of this step is to establish by the executing body the mapping relationship between the two-dimensional map of an area of each material type and white model mapping rendering using the differentiable renderer and the white model mapping rendering technology to obtain the first target model.

White mode mapping rendering technology is a physically-based rendering technology, abbreviated as PBR, which aims to establish the mapping relationship between the two-dimensional map of an area of each material type and white mode mapping rendering.

Alternatively, the mapping relationship between the two-dimensional map of an area of each material type and the white model mapping rendering may be established based on lambert (lighting model), and the appropriate method may be chosen according to the actual situation.

Step 403: establishing a mapping relationship between two-dimensional map of an area of each material type and the hyper-realistic rendering by using the differentiable renderer and a hyper-realistic pipeline, to obtain the second target model.

Distinct from white model mapping rendering performed in step 402, a purpose of this step is to establish by the executing body the mapping relationship between the two-dimensional map of an area of each material type and the hyper-realistic rendering using the differentiable renderer and the hyper-realistic pipeline to obtain the second target model.

Hyper-realistic rendering is a rendering method different from white model mapping rendering, which can obtain rendering results with higher realism, fineness and fidelity than white model mapping rendering, is more suitable for the virtual data space, and can meet the user's requirements for the fineness of the virtual character that act as their own image.

The present embodiment describes in detail on how to perform partitioning, how to perform white model mapping rendering and hyper-realistic rendering respectively on partitioned initial model (virtual digital people) through step 401 to step 403, which, in turn, enhances feasibility of the scheme through a more specific implementation scheme.

Figure 5:
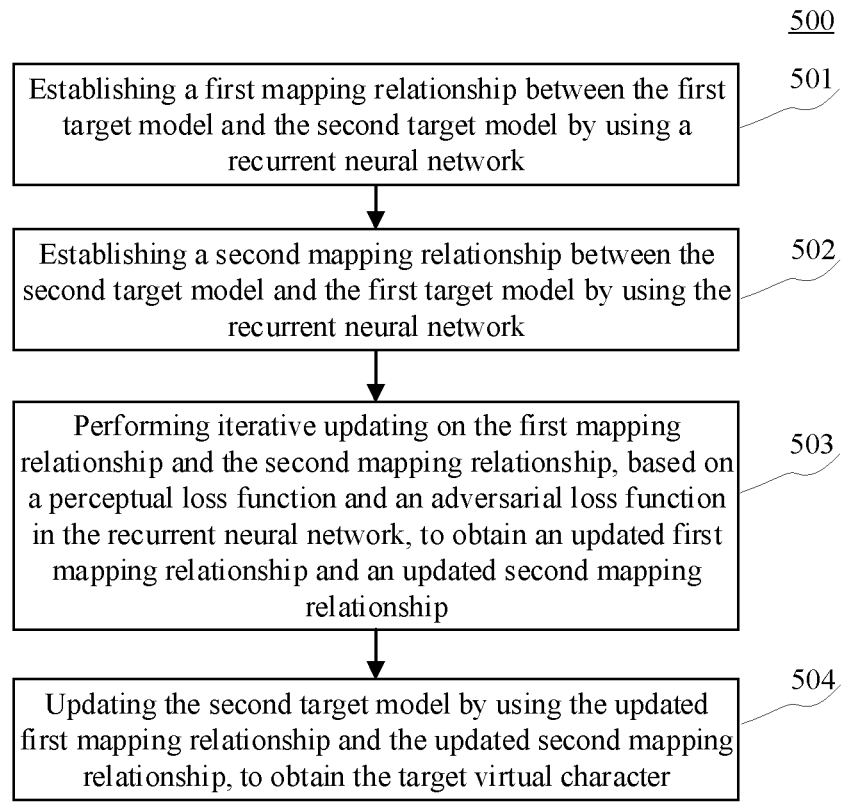
FIG. 5 is a flowchart of a method for optimizing a hyper-realistic rendering effect in the method for generating a virtual character provided by an embodiment of the present disclosure.

With reference to FIG. 5, FIG. 5 is a flowchart of a method for optimizing a hyper-realistic rendering effect provided by an embodiment of the present disclosure, that is, a specific implementation is provided for step 203 in the flow 200 shown in FIG. 2, and other steps in the flow 200 are not adjusted, that is, step 203 may be replaced by the specific implementation provided in the present embodiment to obtain a new complete embodiment. A flow 500 includes the following steps.

Step 501: establishing a first mapping relationship between the first target model and the second target model by using a recurrent neural network.

Step 502: establishing a second mapping relationship between the second target model and the first target model by using the recurrent neural network.

It should be understood that the first mapping relationship is a mapping relationship established by using the first target model as a source of the mapping and using the second target model as a destination of the mapping. The first mapping relationship is configured to determine parts, points, and features on the second target model corresponded by parts, points, and features of the first target model.

The second mapping relationship is a mapping relationship established by using the second target model as a source of the mapping and the first target model as a destination of the mapping. The second mapping relationship is configured to determine parts, points, and features on the first target model corresponded by parts, points, and features on the second target model.

It should be understood that since the sources and the destinations of the mappings are opposite, the first mapping relationship and the second mapping relationship obtained independently are not simply reversible relationships, but are two more independent mapping relationships, which reflect different mapping relationships obtained according to different mapping directions.

Step 503: performing iterative updating on the first mapping relationship and the second mapping relationship, based on a perceptual loss function and an adversarial loss function in the recurrent neural network, to obtain an updated first mapping relationship and an updated second mapping relationship.

On the basis of step 501 and step 502, a purpose of this step is to perform iterative updating on the original first mapping relationship and the original second mapping relationship by the executing body based on the perceptual loss function and the adversarial loss function in the recurrent neural network. A purpose of the iterative updating is to optimize the initial bidirectional mapping relationship, so that the optimized mapping relationship is more accurate, thereby providing a more accurate the second target model.

Further, in addition to the perceptual loss function and the adversarial loss function, an L1 loss function (for minimizing an error, which is a sum of all absolute differences between a true value and a predicted value) of RGB may also be added in the recurrent neural network to optimize model parameters in an RGB space in the case that the RGB dimension is added in the above embodiment.

Step 504: updating the second target model by using the updated first mapping relationship and the updated second mapping relationship, to obtain the target virtual character.

Since a final rendering performed on the model corresponding to the virtual character of the present disclosure is hyper-realistic rendering, this step updates the second target model by using the updated first mapping relationship and the updated second mapping relationship to obtain the target virtual character.

That is, on the basis of the second target model, model details that are not available on the second target model may be learned from the first target model and may be updated into the second target model by using the updated first mapping relationship and the updated second mapping relationship, to obtain the target virtual character with better model details.

It should be noted that although only a unidirectional mapping relationship between the first target model and the second target model is established, it is also possible to learn some model details from the first target model through this unidirectional mapping relationship. By establishing the bidirectional mapping relationship and iterative updating, the present embodiment makes it possible to obtain more accurate model details than the unidirectional mapping relationship through the bidirectional mapping relationship, which in turn makes the target virtual character have a higher degree of realism, fineness and fidelity.

Based on any of the above embodiments, it is also possible to use a U-NET (a neural network having a U-shaped structure) network architecture, to perform crop optimization on relevant convolutional calculations inside a block (model functional unit), and to use floatl 6 (half precision) in the neural network to reduce complexity and time consumption while calculating the forward and gradient back propagation.

Based on any of the above embodiments, in the case where the target virtual character has been obtained, it is also possible to receive a user image input by a target user. By combining the user image with the target virtual character, the virtual character that represents features of the user image are generated for the target user in the virtual data space.

Figure 6:
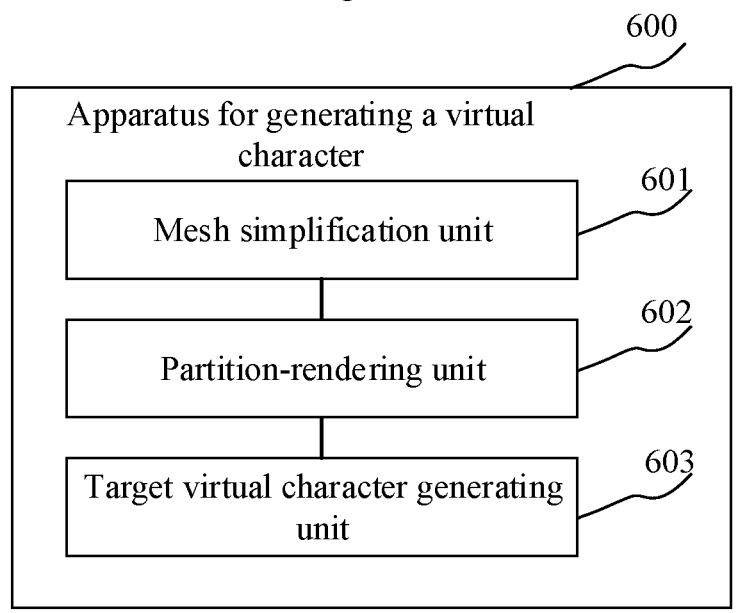
FIG. 6 is a structural block diagram of an apparatus for generating a virtual character provided by an embodiment of the present disclosure.

With further reference to FIG. 6, as an implementation of the method shown in the above figures, the present disclosure provides an embodiment of an apparatus for generating a virtual character, and the apparatus embodiment corresponds to the method embodiment shown in FIG. 2. The apparatus may be applied to various electronic devices.

As shown in FIG. 6, the apparatus 600 for generating a virtual character in the present embodiment may include: a mesh simplification unit 601, a partition-rendering unit 602, a target virtual character generating unit 603. The mesh simplification unit 601 is configured to perform mesh simplification on an initial model of the virtual character to obtain a mesh-simplified model. The partition-rendering unit 602 is configured to obtain a first target model by performing white model mapping rendering on an area of each material type on the mesh-simplified model, and obtain a second target model by performing hyper-realistic rendering on the area of each material type on the mesh-simplified model. The target virtual character generating unit 603 is configured to establish a bidirectional mapping between the first target model and the second target model, to obtain a target virtual character through iterative updating of the bidirectional mapping.

In the present embodiment, in the apparatus 600 for generating a virtual character, for the specific processing and the technical effects of the mesh simplification unit 601, the partition-rendering unit 602, the target virtual character generating unit 603, reference may be made to the relevant descriptions of steps 201 to 203 in the corresponding embodiment of FIG. 2 respectively, and detailed description thereof will be omitted.

In some alternative implementations of the present embodiment, the mesh simplification unit 601 may include:

a boundary protection subunit, configured to perform mesh simplification on the initial model by using a standard mesh simplification algorithm with a mesh simplification mark, to obtain the mesh-simplified model; where the mesh simplification mark is used to indicate that a degree of mesh simplification on a facial area of the initial model is less than a degree of mesh simplification on other areas.

In some alternative implementations of the present embodiment, the mesh simplification unit 601 may further include:

a synchronizing and updating subunit, configured to synchronize and update coordinates of the mesh-simplified initial model in a dimension of a two-dimensional map, to obtain an updated model; and a skeleton skin processing subunit, configured to perform protective processing on areas of five facial sense organs of the updated model by using skeleton skin information of the initial model.

In some alternative implementations of the present embodiment, the mesh simplification unit 601 may further include:

a device type determining subunit, configured to determine a device type of a current device; and a parameter of a target mesh simplification degree determining unit, configured to determine, in response to the device type being a mobile terminal, a parameter of a target mesh simplification degree matching a computing performance of the current mobile terminal.

In some alternative implementations of the present embodiment, the boundary protection subunit may be further configured to:

perform mesh simplification on the initial model by using the standard mesh simplification algorithm with a facial boundary protection mark added, where a parameter of a mesh simplification degree of the standard mesh simplification algorithm is the parameter of the target mesh simplification degree.

In some alternative implementations of the present embodiment, the apparatus 600 for generating a virtual character may further include:

an aligning and coordinate updating unit, configured to perform a model alignment between the mesh-simplified model and the initial model, and updating coordinates of two-dimensional maps of the mesh-simplified model and the initial model.

In some alternative implementations of the present embodiment, the partition-rendering unit 602 may be further configured to:

perform area partitioning on the mesh-simplified model according to material type, to obtain a partition model;

establish a mapping relationship between a two-dimensional map of an area of each material type and the white model mapping rendering by using a differentiable renderer and a white model mapping rendering technology, to obtain the first target model; and establish a mapping relationship between the two-dimensional map of an area of each material type and the hyper-realistic rendering by using the differentiable renderer and a hyper-realistic pipeline, to obtain the second target model.

In some alternative implementations of the present embodiment, the target virtual character generating unit 603 may be further configured to:

establish a first mapping relationship between the first target model and the second target model by using a recurrent neural network;

establish a second mapping relationship between the second target model and the first target model by using the recurrent neural network;

perform iterative updating on the first mapping relationship and the second mapping relationship, based on a perceptual loss function and an adversarial loss function in the recurrent neural network, to obtain an updated first mapping relationship and the updated second mapping relationship; and update the second target model by using the updated first mapping relationship and the updated second mapping relationship, to obtain the target virtual character.

In some alternative implementations of the present embodiment, the apparatus 600 for generating a virtual character may further include:

a user image acquiring unit, configured to acquire a user image of a target user; and a user virtual character generating unit, configured to generate a virtual character corresponding to the target user in a virtual data space, based on the user image and the target virtual character.

The present embodiment serves as an apparatus embodiment corresponding to the above method embodiment. By performing mesh simplification on an initial model of a virtual character to reduce the number of meshes of the model, the apparatus for generating the virtual character provided in the present disclosure reduces complexity of the model. At the same time, combined with partition rendering according to material type, a rendering efficiency is improved. In order to avoid losses of realism and fidelity of the virtual character due to mesh simplification, a bidirectional mapping between white model mapping rendering and hyper-realistic rendering is also established so that hyper-realistic rendering may further learn missing model details recorded in white model mapping rendering from the mapping relationship, thereby improving the realism and fidelity of a target virtual character is improved. While performing mesh simplification, a visual effect of the virtual character is also improved.

According to an embodiment of the present disclosure, the present disclosure also provides an electronic device, and the electronic device includes: at least one processor; and a memory communicatively connected to the at least one processor; where, the memory stores instructions executable by the at least one processor, and the instructions, when executed by the at least one processor, cause the at least one processor to implement the method for generating a virtual character described in any of the above embodiments.

According to an embodiment of the present disclosure, the present disclosure also provides a readable storage medium, and the readable storage medium stores computer instructions, where, the computer instructions are used to cause the computer to implement the method for generating a virtual character described in any of the above embodiments.

According to an embodiment of the present disclosure, the present disclosure also provides a computer program product, including a computer program, the computer program, when executed by a processor, implements the method for generating a virtual character described in any of the above embodiments.

Figure 7:
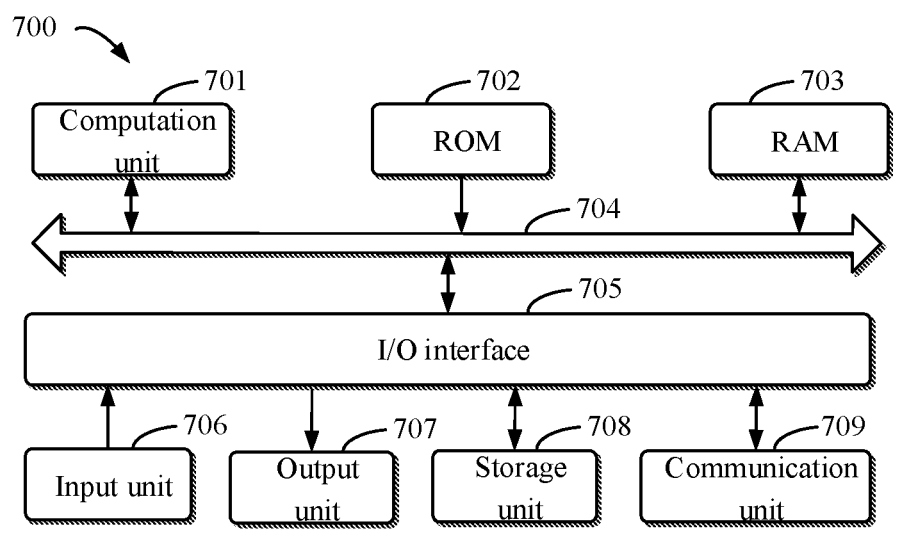
FIG. 7 is a schematic structural diagram of an electronic device suitable for performing the method for generating a virtual character provided by an embodiment of the present disclosure.

FIG. 7 shows a schematic block diagram of an example electronic device 700 that may be used to implement embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The parts shown herein, their connections and relationships, and their functions are merely examples, and are not intended to limit the implementation of the present disclosure described and/or claimed herein.

As shown in FIG. 7, the device 700 includes a computation unit 701, which may perform various appropriate actions and processing, based on a computer program stored in a read-only memory (ROM) 702 or a computer program loaded from a storage unit 708 into a random access memory (RAM) 703. In the RAM 703, various programs and data required for the operation of the device 700 may also be stored. The computation unit 701, the ROM 702, and the RAM 703 are connected to each other through a bus 704. An input/output (I/O) interface 705 is also connected to the bus 704.

A plurality of parts in the device 700 are connected to the I/O interface 705, including: an input unit 706, for example, a keyboard and a mouse; an output unit 707, for example, various types of displays and speakers; the storage unit 708, for example, a disk and an optical disk; and a communication unit 709, for example, a network card, a modem, or a wireless communication transceiver. The communication unit 709 allows the device 700 to exchange information/data with other devices over a computer network such as the Internet and/or various telecommunication networks.

The computation unit 701 may be various general-purpose and/or dedicated processing components having processing and computing capabilities. Some examples of the computation unit 701 include, but are not limited to, central processing unit (CPU), graphics processing unit (GPU), various dedicated artificial intelligence (AI) computing chips, various computation units running machine learning model algorithms, digital signal processors (DSP), and any appropriate processors, controllers, microcontrollers, etc. The computation unit 701 performs the various methods and processes described above, such as the method for generating a virtual character. For example, in some embodiments, the method for generating a virtual character may be implemented as a computer software program, which is tangibly included in a machine readable medium, such as the storage unit 708. In some embodiments, part or all of the computer program may be loaded and/or installed on the device 700 via the ROM 702 and/or the communication unit 709. When the computer program is loaded into the RAM 703 and executed by the computation unit 701, one or more steps of the method for generating a virtual character described above may be performed. Alternatively, in other embodiments, the computation unit 701 may be configured to perform the method for generating a virtual character by any other appropriate means (for example, by means of firmware).

Various embodiments of the systems and technologies described above in this paper can be implemented in digital electronic circuit systems, integrated circuit systems, field programmable gate arrays (FPGAs), application specific integrated circuits (ASIC), application specific standard products (ASSP), system on chip (SOC), load programmable logic devices (CPLD), computer hardware, firmware, software, and/or combinations thereof. These various embodiments may include: being implemented in one or more computer programs, the one or more computer programs can be executed and/or interpreted on a programmable system including at least one programmable processor, which can be a special-purpose or general-purpose programmable processor, and can receive data and instructions from the storage system, at least one input device, and at least one output device, and transmitting data and instructions to the storage system, the at least one input device, and the at least one output device.

The program code for implementing the methods of the present disclosure may be written in any combination of one or more programming languages. These program codes can be provided to the processor or controller of general-purpose computer, special-purpose computer or other programmable data processing device, so that when the program code is executed by the processor or controller, the functions/operations specified in the flow chart and/or block diagram are implemented. The program code can be completely executed on the machine, partially executed on the machine, partially executed on the machine and partially executed on the remote machine as a separate software package, or completely executed on the remote machine or server.

In the context of the present disclosure, a machine-readable medium may be a tangible medium that may contain or store a program for use by or in combination with an instruction execution system, apparatus, or device. The machine-readable medium can be a machine-readable signal medium or a machine-readable storage medium. Machine readable media may include, but are not limited to, electronic, magnetic, optical, electromagnetic, infrared, or semiconductor systems, apparatuses, or devices, or any suitable combination of the foregoing. More specific examples of machine-readable storage media may include one or more wire based electrical connections, portable computer disks, hard disks, random access memory (RAM), read only memory (ROM), erasable programmable read only memory (EPROM or flash memory), optical fibers, compact disk read only memory (CD-ROM), optical storage devices, magnetic storage devices, or any suitable combination of the above.

In order to provide interaction with users, the systems and techniques described herein can be implemented on a computer with: a display device for displaying information to users (for example, a CRT (cathode ray tube) or LCD (liquid crystal display) monitor); and a keyboard and a pointing device (e.g., a mouse or a trackball) through which the user can provide input to the computer. Other kinds of devices can also be used to provide interaction with users. For example, the feedback provided to the user may be any form of sensor feedback (e.g., visual feedback, auditory feedback, or tactile feedback); and the input from the user can be received in any form (including acoustic input, voice input or tactile input).

The systems and techniques described herein may be implemented in a computing system including background components (e.g., as a data server), or a computing system including middleware components (e.g., an application server) or a computing system including a front-end component (e.g., a user computer with a graphical user interface or a web browser through which a user can interact with embodiments of the systems and techniques described herein), or a computing system including any combination of the back-end component, the middleware component, the front-end component. The components of the system can be interconnected by digital data communication (e.g., communication network) in any form or medium. Examples of communication networks include local area networks (LANs), wide area networks (WANs), and the Internet.

A computer system may include a client and a server. The client and the server are generally far away from each other and usually interact through communication networks. The relationship between the client and the server is generated by computer programs running on the corresponding computers and having a client server relationship with each other. The server can be a cloud server, also known as cloud computing server or cloud host, is a host product in the cloud computing service system, to solve the defects of the management difficulty and weak service scalability of difficult management and weak expansibility when the traditional physical host and Virtual Private Server (VPS) are in services, or the server can be a distributed system server, or a blockchain server.

The technical solution according to the embodiments of the present disclosure, by performing mesh simplification on an initial model of a virtual character to reduce the number of meshes of the model, the method for generating the virtual character provided in the present disclosure reduces complexity of the model. At the same time, combined with partition rendering according to material type, a rendering efficiency is improved. In order to avoid losses of realism and fidelity of the virtual character due to mesh simplification, a bidirectional mapping between white model mapping rendering and hyper-realistic rendering is also established so that hyper-realistic rendering may further learn missing model details recorded in white model mapping rendering from the mapping relationship, thereby improving the realism and fidelity of a target virtual character is improved. While performing mesh simplification, a visual effect of the virtual character is also improved.

It should be understood that various forms of processes shown above can be used to reorder, add or delete steps. For example, the steps recorded in the present disclosure can be performed in parallel, in sequence, or in different orders, as long as the desired results of the technical solution of the present disclosure can be achieved, which is not limited herein.

The above specific embodiments do not constitute restrictions on the scope of the present disclosure. Those skilled in the art should understand that various modifications, combinations, sub combinations and substitutions can be made according to design requirements and other factors. Any modification, equivalent replacement and improvement made within the spirit and principles of this disclosure shall be included in the scope of protection of this disclosure.

What is claimed is:

1. A method for generating a virtual character, the method comprising:
   performing mesh simplification on an initial model of the virtual character by using a standard mesh simplification algorithm with a mesh simplification mark, to obtain a mesh-simplified model; wherein the mesh simplification mark is used to indicate that a degree of mesh simplification on a facial area of the initial model is less than a degree of mesh simplification on other areas;
   obtaining a first target model by performing white model mapping rendering on an area of each material type on the mesh-simplified model, and obtaining a second target model by performing hyper-realistic rendering on the area of each material type on the mesh-simplified model; and
   establishing a bidirectional mapping between the first target model and the second target model, and obtaining a target virtual character through iterative updating of the bidirectional mapping.

2. The method according to claim 1, wherein the method further comprises:
   synchronizing and updating coordinates of the mesh-simplified initial model in a dimension of a two-dimensional map, to obtain an updated model; and performing protective processing on areas of five facial sense organs of the updated model by using skeleton skin information of the initial model.

3. The method according to claim 1, wherein the method further comprises:
determining a device type of a current device; and
determining, in response to the device type being a mobile terminal, a parameter of a target mesh simplification degree matching a computing performance of the current mobile terminal.

4. The method according to claim 3, wherein the performing mesh simplification on the initial model by using the standard mesh simplification algorithm with the mesh simplification mark, comprises:
performing mesh simplification on the initial model by using the standard mesh simplification algorithm with a facial boundary protection mark, wherein a parameter of a mesh simplification degree of the standard mesh simplification algorithm is the parameter of the target mesh simplification degree.

5. The method according to claim 1, wherein the method further comprises:
performing a model alignment between the mesh-simplified model and the initial model, and updating coordinates of two-dimensional maps of the mesh-simplified model and the initial model.

6. The method according to claim 1, wherein the obtaining the first target model by performing white model mapping rendering on the area of each material type on the mesh-simplified model, and obtaining the second target model by performing hyper-realistic rendering on the area of each material type on the mesh-simplified model, comprises:
performing area partitioning on the mesh-simplified model according to material type, to obtain a partition model;
establishing a mapping relationship between a two-dimensional map of an area of each material type and the white model mapping rendering by using a differentiable renderer and a white model mapping rendering technology, to obtain the first target model; and
establishing a mapping relationship between the two-dimensional map of an area of each material type and the hyper-realistic rendering by using the differentiable renderer and a hyper-realistic pipeline, to obtain the second target model.

7. The method according to claim 1, wherein the establishing the bidirectional mapping between the first target model and the second target model, and obtaining the target virtual character through iterative updating of the bidirectional mapping, comprises:
establishing a first mapping relationship between the first target model and the second target model by using a recurrent neural network;
establishing a second mapping relationship between the second target model and the first target model by using the recurrent neural network;
performing iterative updating on the first mapping relationship and the second mapping relationship, based on a perceptual loss function and an adversarial loss function in the recurrent neural network, to obtain an updated first mapping relationship and an updated second mapping relationship; and
updating the second target model by using the updated first mapping relationship and the updated second mapping relationship, to obtain the target virtual character.

8. The method according to claim 1, wherein the method further comprises:

acquiring a user image of a target user; and
generating a virtual character corresponding to the target user in a virtual data space, based on the user image and the target virtual character.

9. An electronic device, comprising:
at least one processor; and
a memory communicatively connected to the at least one processor; wherein the memory stores instructions executable by the at least one processor, and the instructions, when executed by the at least one processor, cause the at least one processor to perform operations comprising:
performing mesh simplification on an initial model of the virtual character by using a standard mesh simplification algorithm with a mesh simplification mark, to obtain a mesh-simplified model; wherein the mesh simplification mark is used to indicate that a degree of mesh simplification on a facial area of the initial model is less than a degree of mesh simplification on other areas;
obtaining a first target model by performing white model mapping rendering on an area of each material type on the mesh-simplified model, and obtaining a second target model by performing hyper-realistic rendering on the area of each material type on the mesh-simplified model; and
establishing a bidirectional mapping between the first target model and the second target model, and obtaining a target virtual character through iterative updating of the bidirectional mapping.

10. The electronic device according to claim 9, wherein the operations further comprise:
synchronizing and updating coordinates of the mesh-simplified initial model in a dimension of a two-dimensional map, to obtain an updated model; and
performing protective processing on areas of five facial sense organs of the updated model by using skeleton skin information of the initial model.

11. The electronic device according to claim 9, wherein the operations further comprise:
determining a device type of a current device; and
determining, in response to the device type being a mobile terminal, a parameter of a target mesh simplification degree matching a computing performance of the current mobile terminal.

12. The electronic device according to claim 11, wherein the performing mesh simplification on the initial model by using the standard mesh simplification algorithm with the mesh simplification mark, comprises:
performing mesh simplification on the initial model by using the standard mesh simplification algorithm with a facial boundary protection mark, wherein a parameter of a mesh simplification degree of the standard mesh simplification algorithm is the parameter of the target mesh simplification degree.

13. The electronic device according to claim 9, wherein the operations further comprise:
performing a model alignment between the mesh-simplified model and the initial model, and updating coordinates of two-dimensional maps of the mesh-simplified model and the initial model.

14. The electronic device according to claim 9, wherein the obtaining the first target model by performing white model mapping rendering on the area of each material type on the mesh-simplified model, and obtaining the second target model by performing hyper-realistic rendering on the area of each material type on the mesh-simplified model, comprises:
    performing area partitioning on the mesh-simplified model according to material type, to obtain a partition model;
    establishing a mapping relationship between a two-dimensional map of an area of each material type and the white model mapping rendering by using a differentiable renderer and a white model mapping rendering technology, to obtain the first target model; and
    establishing a mapping relationship between the two-dimensional map of an area of each material type and the hyper-realistic rendering by using the differentiable renderer and a hyper-realistic pipeline, to obtain the second target model.

15. The electronic device according to claim 9, wherein the establishing the bidirectional mapping between the first target model and the second target model, and obtaining the target virtual character through iterative updating of the bidirectional mapping, comprises:
    establishing a first mapping relationship between the first target model and the second target model by using a recurrent neural network;
    establishing a second mapping relationship between the second target model and the first target model by using the recurrent neural network;
    performing iterative updating on the first mapping relationship and the second mapping relationship, based on a perceptual loss function and an adversarial loss function in the recurrent neural network, to obtain an updated first mapping relationship and an updated second mapping relationship; and
    updating the second target model by using the updated first mapping relationship and the updated second mapping relationship, to obtain the target virtual character.

16. The electronic device according to claim 9, wherein the operations further comprise:
    acquiring a user image of a target user; and
    generating a virtual character corresponding to the target user in a virtual data space, based on the user image and the target virtual character.

17. A non-transitory computer readable storage medium storing computer instructions, wherein the computer instructions are used to cause the computer to perform operations comprising:
    performing mesh simplification on an initial model of the virtual character by using a standard mesh simplification algorithm with a mesh simplification mark, to obtain a mesh-simplified model; wherein the mesh simplification mark is used to indicate that a degree of mesh simplification on a facial area of the initial model is less than a degree of mesh simplification on other areas;
    obtaining a first target model by performing white model mapping rendering on an area of each material type on the mesh-simplified model, and obtaining a second target model by performing hyper-realistic rendering on the area of each material type on the mesh-simplified model; and
    establishing a bidirectional mapping between the first target model and the second target model, and obtaining a target virtual character through iterative updating of the bidirectional mapping.

* * * * *